United States Patent
Wobben

(10) Patent No.: US 6,819,086 B2
(45) Date of Patent: Nov. 16, 2004

(54) POWER SUPPLY DEVICE FOR EMERGENCY SHUT DOWN OF A WIND TURBINE

(76) Inventor: Aloys Wobben, Argestrasse 19, D-26607 Aurich (DE)

( * ) Notice: Subject to any disclaimer, the term of this patent is extended or adjusted under 35 U.S.C. 154(b) by 0 days.

(21) Appl. No.: 10/332,417

(22) PCT Filed: Jun. 30, 2001

(86) PCT No.: PCT/EP01/07508

§ 371 (c)(1),
(2), (4) Date: Jul. 11, 2003

(87) PCT Pub. No.: WO02/05406

PCT Pub. Date: Jan. 17, 2002

(65) Prior Publication Data

US 2004/0100229 A1 May 27, 2004

(51) Int. Cl.⁷ .................. H01M 10/44; H01M 10/46
(52) U.S. Cl. .................................................. 320/166
(58) Field of Search .......................... 320/101, 166, 320/167; 290/42, 43, 44, 54, 55

(56) References Cited

U.S. PATENT DOCUMENTS

| | | | | |
|---|---|---|---|---|
| 4,146,264 A | * | 3/1979 | Korzeniewski | 290/44 |
| 4,316,096 A | * | 2/1982 | Syverson | 290/44 |
| 4,427,897 A | * | 1/1984 | Migliori | 290/44 |
| 5,907,192 A | | 5/1999 | Lyons et al. | 290/44 |

FOREIGN PATENT DOCUMENTS

| | | |
|---|---|---|
| DE | 196 18 039 A1 | 11/1997 |
| DE | 197 55 499 A1 | 6/1999 |

* cited by examiner

Primary Examiner—Edward H. Tso
(74) Attorney, Agent, or Firm—Seed IP Law Group PLLC

(57) ABSTRACT

The present invention provides an improved arrangement for supplying emergency power to a wind power installation. In the event of a power failure, sufficient emergency power may be supplied to reposition the rotor blades of the wind power installation and avoid damage to the overall system. This is done through the use of one or more capacitors. The capacitors may be charged with energy during the normal operation of the wind power installation and, in the event of a system failure, the energy stored within the capacitors may be used to provide emergency functions. In addition to repositioning the rotor blades, the stored energy may be used, for example, to rotate the wind power installation pod away from the wind and power emergency or auxiliary lighting systems.

27 Claims, 1 Drawing Sheet

POWER SUPPLY DEVICE FOR EMERGENCY SHUT DOWN OF A WIND TURBINE

BACKGROUND OF THE INVENTION

1. Field of the Invention

The present invention provides a unique arrangement for providing emergency power to a wind power installation, including the use of one or more capacitors as a storage means for electrical energy.

2. Description of the Related Art

In the known prior art, wind power installations emergency power is typically supplied by means of accumulators, in particular lead accumulators, so that in the event of a power failure the wind power installation can be put into a position that avoids damage to the wind power installation. For example, in the event of a power failure, which may occur due to a short-circuit in the power supply system, lead accumulators are used to supply the emergency power needed to adjust the blades of the wind power installation, so that the entire wind power installation rotor may be brought to a stop and thereby no longer experience any substantial drive due to the energy of the wind. In the event of a power failure, it may also be necessary to rotate the wind power installation pod 'out of the wind', in which case, lead accumulators may also be used as an emergency power supply device to accomplish this task.

However, the disadvantage of lead accumulators is that they are relatively heavy, they take up a great deal of space and, since lead accumulators cannot be charged and discharged an unlimited number of times, the charging and discharging properties of the lead accumulators deteriorate with time. In addition, the storage of a lead accumulator requires relatively high maintenance costs and thereby increases the costs of a wind power installation and operation.

Elektrizitätswirtschaft, volume 1994 (1995), issue 14, pages 842 through 845, disclose various power storage arrangements for supplying energy. Also set forth therein are electrical storage means which are used in generating plants, apart from their function as an emergency power supply, for load compensation purposes and for providing seconds reserves whereby the utilization duration of the energy-generating installations is improved. Double-layer capacitors are also mentioned in this connection.

DE 196 51 364 A1 discloses an apparatus for improving the network compatibility of wind power installations with asynchronous generators, wherein an electronically controlled device, which includes an intermediate energy storage means, is connected in parallel with the public power supply network, and mention is also made of a capacitor as a possible form of the intermediate storage means.

Despite these disclosures, Applicant believes that there is a need for a new and improved arrangement for providing emergency power to a wind power installation and the present invention provides such system.

BRIEF SUMMARY OF THE INVENTION

The present invention provides an improved arrangement for supplying emergency power to a wind power installation. In the event of a power failure, sufficient emergency power may be supplied to reposition the rotor blades of the wind power installation and avoid damage to the overall system. This is done through the use of one or more capacitors. The capacitors may be charged with energy during the normal operation of the wind power installation and, in the event of a system failure, the energy stored within the capacitors may be used to provide emergency functions. In addition to repositioning the rotor blades, the stored energy may be used, for example, to rotate the wind power installation pod away from the wind, and power emergency or auxiliary lighting systems.

DETAILED DESCRIPTION OF THE INVENTION

Figure 1:
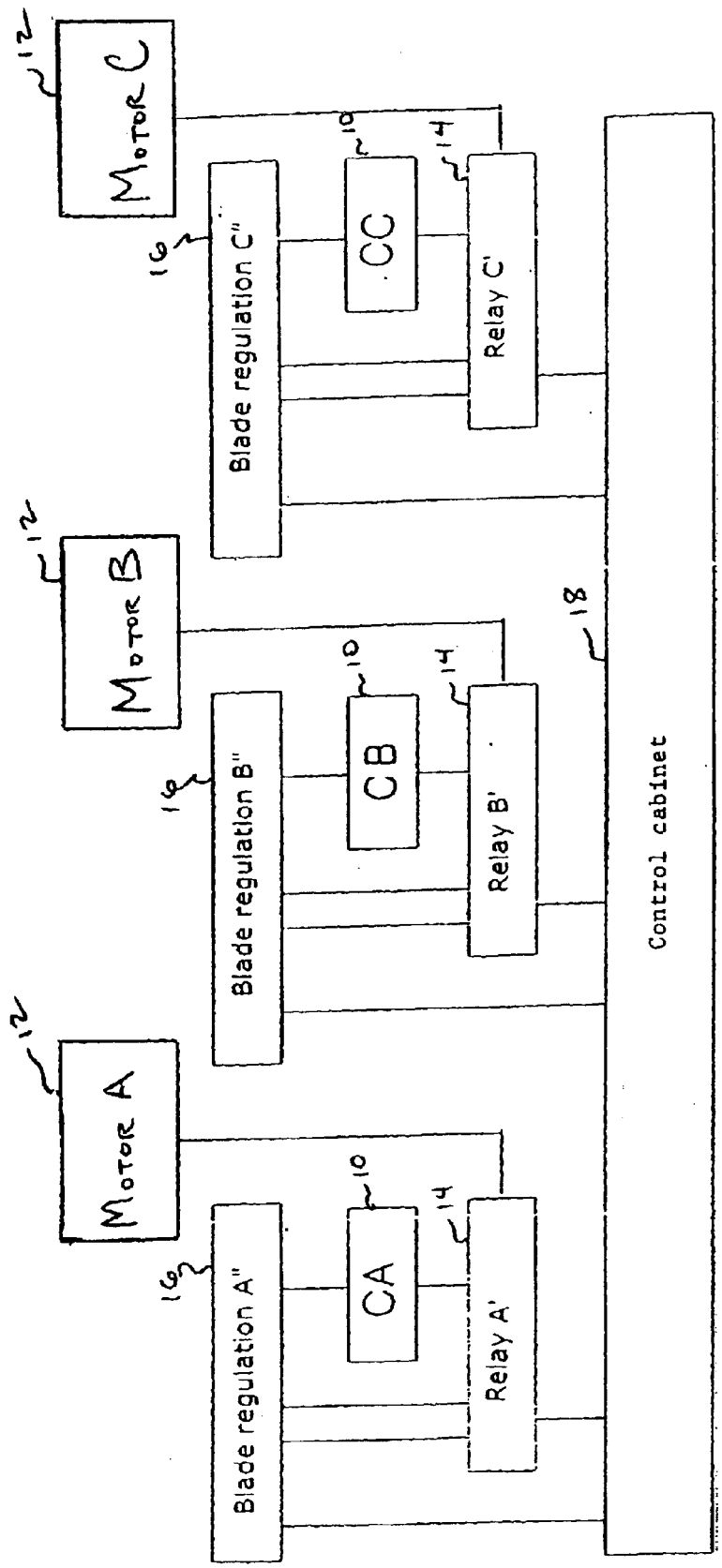
FIG. 1 is a diagram showing the basic circuitry, according to the principals of the present invention, for providing emergency power to adjust the rotor blades of a wind power installation.

According to the principles of the present invention, a capacitor is used to provide electrical energy to a wind power installation and thereby perform various functions.

The particular advantage of capacitors lies in the freedom from maintenance and the unlimited number of charging and discharging processes, in contrast to conventional accumulators or batteries.

Particularly suitable for this purpose is a capacitor produced by Siemens Matsushita Components GmbH & Co KG under the name 'UltraCap' and article No B48710-A0283-Q035. That capacitor has the following technical data:

| | | |
|---|---|---|
| (Nominal) capacitance CR (DCC[1], 25° C.): | 2.8 F | |
| Capacitance tolerance: | −10 . . . +30% | |
| (Nominal) voltage UR | 75 V | |
| Output[2] | 578 W/kg | 765 W/l |
| Max. charging/discharging current $I_c$ (25° C.) | 25 A | |
| Stored energy (at $U_R$) | 7875 J | |
| Specific energy (at $U_R$) | 1.09 Wh/kg | 1.43 Wh/l |
| Surge voltage | 88 V | |
| Max. leakage current $I_{LC}$ (12 h, 25° C.) | 4 mA | |
| Max. series resistance $ESR^{DC}$ (DCC, 25° C. | 800 mΩ | |
| Max. series resistance $ESR^{HF}$ (1 kHz, 25° C.) | 480 mΩ | |
| Weight | 2 kg | |
| Volume | 1.5 l | |
| Operating temperature | −25 . . . +65° C. | |
| Storage temperature | −35 . . . +65° C. | |
| Service life (25° C., UR) | 180,000 h | |
| Height × width × length | 70 × 70 × 312 mm | |

[1]DCC: discharge at constant current
[2]discharge of UR after UR/2 with IC = 25 A.

FIG. 1 shows the basic diagram for using one or more capacitors 10 to adjust the rotor blades of a wind power installation. In this example, the rotor of the wind power installation has three rotor blades (not shown) and each individual rotor blade can be set (regulated) to a desired pitch angle via an adjusting motor 12 (A, B or C) couplable to each individual rotor blade. Each adjusting motor 12 may be controlled by way of a respective relay 14, (A', B' or C').

A blade regulating device 16 (A", B" or C") is positioned adjacent to the motor 12 and coupled to the capacitor 10. Via relay 14, the blade regulating device 16 receives its values from a control unit 18 (control cabinet). In the event of an emergency shut-down, which may be caused, for example, by a short-circuit in either the wind power installation or the power supply device, the blade regulating device 16 effects a blade adjustment which turns each rotor blade out of the wind, so that the rotor blades no longer produce any drive to the rotor.

The energy required by each blade regulating device 16 is provided by a capacitor 10 (in this example, CA, CB and CC). The capacitors 10 are provided with a connection (not shown) to the generator of the wind power installation so that during the normal operation of a wind power installation, the capacitors 10 receive a charge. In this way, the capacitors 10 are always prepared to provide a sufficient amount of energy to set the rotor blades to a desired pitch angle if necessary. Since the capacitors 10 have a very small design configuration, they can be positioned directly at the adjusting motors and can also be held by them. However, it is also possible for all capacitors 10 to be positioned together in their own accommodation and, if necessary, to be switched on as the emergency power supply device for rotor blade adjustment or for other parts of the wind power installation (for example for alarm lighting or hazard lights).

Although a single capacitor may be used, it is advantageous to provide a plurality of capacitors connected in parallel so that a sufficient emergency power capacity can always be made available.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An emergency power supply unit of a wind power installation, comprising:
   capacitor storage means charged up during normal operation of the wind power installation;
   a rotor blade of the wind power installation;
   an adjusting motor for adjusting the rotor blade; and
   a device for regulating the blade adjustment of the rotor blade, configured, in the event of a power failure, to provide energy from the capacitor storage means to the adjusting motor.

2. A method of generating electrical energy in a wind power installation comprising:
   storing electrical energy in a capacitor during normal operation of a wind power installation;
   using the electrical energy stored in the capacitor during a power failure; and
   using the energy stored in the capacitor to adjust a rotor blade of the wind power installation.

3. The method according to claim 2 further comprising:
   using the energy stored in the capacitor to rotate a wind power installation pod.

4. The method according to claim 2 further comprising:
   using the energy stored in the capacitor to power auxiliary parts of a wind power installation.

5. The method according to claim 2 further comprising:
   positioning the capacitor adjacent to an adjusting motor; and
   coupling the capacitor to a blade regulating device.

6. The method according to claim 2 wherein the capacitor comprises a plurality of capacitors connected in parallel.

7. A method of generating auxiliary power in a wind power installation comprising:
   positioning a capacitor adjacent to an adjusting motor of a wind power installation;
   using the motor to charge the capacitor during normal operation of the wind power installation;
   using energy stored in the capacitor to power various components of the wind power installation, including the adjusting motor.

8. A wind power installation, comprising:
   a capacitor positioned adjacent to an adjusting motor of the wind power installation and configured to provide energy to the adjusting motor in the event of a power failure.

9. The wind power installation according to claim 8 wherein the capacitor is coupled to a blade regulating device.

10. The wind power installation according to claim 8 wherein the capacitor is coupled to a lighting system.

11. The wind power installation according to claim 8 wherein the capacitor comprises a plurality of capacitors connected in parallel.

12. The emergency power supply unit of claim 1 wherein the capacitor storage means is positioned at the adjusting motor of a rotor blade.

13. An energy power supply unit of a wind power installation having a plurality of rotor blades, wherein an adjusting motor is provided for at least one of said plurality of rotor blades, wherein at least one device for regulating the adjustment of said at least one of said plurality of rotor blades is provided, said emergency power supply unit comprising:
   at least one capacitor storage means being charged up during normal operation of the wind power installation being positioned close to said at least one adjusting motor of said at least one of said plurality of rotor blades and being coupled to said at least one device for regulating the adjustment of the rotor blade, wherein the energy stored in said capacitor storage means is used to adjust at least one of said plurality of rotor blades in an emergency situation or during a power failure.

14. A method of generating electrical energy in a wind power installation having a plurality of rotor blades and at least one adjusting motor for adjusting at least one of said plurality of rotor blades, comprising the steps of:
   storing electrical energy in a capacitor positioned close to said at least one adjusting motor during normal operation of the wind power installation,
   using the energy stored in said capacitor to adjust at least one of said rotor blades of said wind power installation during power failure or in an emergency situation.

15. Method according to claim 14, further comprising the step of using the energy stored in said capacitor to rotate a wind power installation pod.

16. Method according to claim 14, further comprising the step of
   using the energy stored in said capacitor to power auxiliary parts of the wind power installation.

17. Method according to claim 14, wherein the capacitor comprises a plurality of capacitors connected in parallel.

18. A wind power installation, comprising:
   a plurality of rotor blades;
   an adjusting motor for at least one of said plurality of rotor blades;

at least one device for regulating the adjustment of said at least one of said plurality of rotor blades;

an emergency power supply unit including:

at least one capacitor storage means positioned close to said at least one adjusting motor of said at least one of said plurality of rotor blades and being coupled to said at least one device for regulating the adjustment of the rotor blade, the capacitor storage means being configured to charge up during normal operation of the wind power installation, and to provide the energy stored in said capacitor storage means to adjust at least one of said plurality of rotor blades in an emergency situation or during a power failure.

19. The wind power installation according to claim 18, further comprising a lighting system, wherein said at least one capacitor is coupled to said lighting system.

20. The wind power installation according to claim 18, wherein said at least one capacitor comprises a plurality of capacitors connected in parallel.

21. A system, comprising:

a wind turbine generator including a plurality of variable pitch rotor blades;

a motor configured to vary the pitch of at least one of the rotor blades; and a capacitor configured to store sufficient energy to power the motor to reposition the at least one rotor blade.

22. The system of claim 21 wherein the motor is one of a plurality of motors each configured to vary the pitch of a respective one of the rotor blades, and wherein the capacitor is configured to store sufficient energy to power the plurality of motors to reposition each of the rotor blades.

23. The system of claim 21 wherein the capacitor comprises a plurality of parallel connected capacitors.

24. A wind turbine, comprising:

a motor coupled to a rotatable component of the wind turbine;

a capacitor;

means for regulating the capacitor such that the capacitor is maintained at an optimum charge level during normal operation of the wind turbine and such that the capacitor is directly coupled to the motor during emergency operation of the wind turbine.

25. The wind turbine of claim 24 wherein the rotatable component is selected from among a blade of the wind turbine and an installation pod of the wind turbine.

26. The wind turbine of claim 24 wherein the motor is positioned adjacent to the motor.

27. A method, comprising:

charging a capacitor;

rotating, in the event of a power failure, a wind turbine blade to an angle at which substantially no wind energy is transmitted by the blade to a generator; and drawing energy to perform the rotating step from the capacitor.

* * * * *